(12) United States Patent
Rudd et al.

(10) Patent No.: US 10,346,963 B2
(45) Date of Patent: Jul. 9, 2019

(54) POINT CLOUD MERGING FROM MULTIPLE CAMERAS AND SOURCES IN THREE-DIMENSIONAL PROFILOMETRY

(71) Applicant: CyberOptics Corporation, Golden Valley, MN (US)

(72) Inventors: Eric P. Rudd, Hopkins, MN (US); Carl E. Haugan, St. Paul, MN (US)

(73) Assignee: CyberOptics Corporation, Golden Valley, MN (US)

( * ) Notice: Subject to any disclaimer, the term of this patent is extended or adjusted under 35 U.S.C. 154(b) by 446 days.

(21) Appl. No.: 14/850,470

(22) Filed: Sep. 10, 2015

(65) Prior Publication Data
US 2016/0078610 A1 Mar. 17, 2016

Related U.S. Application Data

(60) Provisional application No. 62/048,933, filed on Sep. 11, 2014.

(51) Int. Cl.
*G01B 11/25* (2006.01)
*G06T 7/00* (2017.01)
(Continued)

(52) U.S. Cl.
CPC ........ *G06T 7/0004* (2013.01); *G01B 11/2545* (2013.01); *G06T 7/521* (2017.01);
(Continued)

(58) Field of Classification Search
CPC .......... G01B 11/25; G06T 2207/10028; G06T 2207/30141; G06T 2207/30152; G06T 7/0004; G06T 7/521; G06T 7/586
(Continued)

(56) References Cited

U.S. PATENT DOCUMENTS

| 5,768,443 A | 6/1998 | Michael et al. |
| 6,750,899 B1 | 6/2004 | Fishbaine et al. |

(Continued)

FOREIGN PATENT DOCUMENTS

| JP | 2009-530614 A | 8/2009 |
| JP | 2012-083233 A | 4/2012 |

(Continued)

OTHER PUBLICATIONS

Chen et al. (Outlier Detection: A Novel Depth Approach) Nov. 29, 2008.*

(Continued)

*Primary Examiner* — Jamie J Atala
*Assistant Examiner* — James T Boylan
(74) *Attorney, Agent, or Firm* — Kelly, Holt & Christenson PLLC; Christopher R. Christenson

(57) ABSTRACT

A computer-implemented method of and system for measuring a three-dimensional surface are provided. The method includes projecting structured illumination on the surface and acquiring a plurality of sets of images. The sets of images are processed to obtain a plurality of point clouds. A spatial accumulator is defined. A first point cloud of the plurality of point clouds is combined with a second point cloud of the plurality of point clouds into the spatial accumulator. Spatial coordinates of the surface are generated based on the contents of the spatial accumulator.

26 Claims, 13 Drawing Sheets

(51) Int. Cl.
*G06T 7/521* (2017.01)
*G06T 7/586* (2017.01)

(52) U.S. Cl.
CPC .... *G06T 7/586* (2017.01); *G06T 2207/10028* (2013.01); *G06T 2207/30141* (2013.01); *G06T 2207/30152* (2013.01)

(58) Field of Classification Search
USPC .......................................................... 348/87
See application file for complete search history.

(56) References Cited

U.S. PATENT DOCUMENTS

| | | | | |
|---|---|---|---|---|
| 2004/0240754 | A1 | 12/2004 | Smith et al. | |
| 2007/0057946 | A1* | 3/2007 | Albeck | G01B 11/2513 345/427 |
| 2007/0183653 | A1* | 8/2007 | Medioni | G06K 9/00208 382/154 |
| 2007/0253635 | A1* | 11/2007 | Chang | G01B 21/045 382/260 |
| 2008/0170219 | A1* | 7/2008 | Sarunic | A61B 3/102 356/73 |
| 2013/0004060 | A1* | 1/2013 | Bell | G01S 17/89 382/154 |
| 2013/0089259 | A1* | 4/2013 | Cha | G06K 9/00664 382/173 |
| 2014/0003705 | A1* | 1/2014 | Taguchi | G06T 7/579 382/154 |
| 2014/0037189 | A1* | 2/2014 | Ziegler | G06T 17/00 382/154 |
| 2014/0253929 | A1* | 9/2014 | Huang | G01B 11/245 356/611 |
| 2014/0361072 | A1* | 12/2014 | Fedorovskaya | G06K 9/2036 235/375 |
| 2015/0042510 | A1* | 2/2015 | Carande | G01S 13/9023 342/25 C |
| 2016/0124208 | A1* | 5/2016 | Best | G02B 21/0076 359/363 |
| 2016/0238827 | A1* | 8/2016 | Shroff | G02B 21/0032 |

FOREIGN PATENT DOCUMENTS

| | | | |
|---|---|---|---|
| JP | 2012-0127704 A | 7/2012 | |
| WO | WO 2008-120882 A1 | 10/2008 | |
| WO | 2013/058710 A1 | 4/2013 | |

OTHER PUBLICATIONS

European Communication pursuant to Rules 161 and 162 EPC for European Patent Application No. 15839305.8, dated Apr. 20, 2017, 2 pages.
International Preliminary Report on Patentability for PCT/US2015/049429, dated Mar. 23, 2017, 13 pages.
International Search Report and Written Opinion for International Application No. PCT/US2015/049429, dated Dec. 28, 2015, date of filing: Sep. 10, 2015, 15 pages.
"A fast all nearest neighbor algorithm for applications involving large point-clouds", Computers & Graphics 31, (2007) pp. 157-174, by Jagan Sankaranarayanan, Hanan Samet and Amitabh Varshney.
"Efficient RANSAC for Point-Cloud Shape Detection",Computer Graphics Group (2007), by Ruwen Schnabel, Roland Wahl and Reinhard Klien.
"Real-time scattering compensation for time-of-flight camera", Proceedings of ICVS, (2007), by James Mure-Dubois & Heinz Hugli.
"Calibration and Multipath Mitigation for Increased Accuracy of Time-of-Flight Camera Measurements in Robotic Applications", Berlin 2012, by Stephan Fuchs.
"Very High Resolution 3D Surface Scanning Using Multi-Frequency Phase Measuring Profilometry", Spaceborne Sensors II, (2005), vol. 5798, pp. 44-53, By Yalla, V. G. & Hassebrook, L.G.
"Optimized two-frequency phase-measuring-profilometry light-sensor temporal-noise sensitivity", J. Opt. Soc. Am., vol. 20,(2003), pp. 106-115, by Li, J.; Hassebrook, L.G. & Guan, C.
First Office Action dated Mar. 20, 2018, for Japanese Patent Application No. 2017-513733, 17 pages including English translation.
Office Action dated Jan. 15, 2018, for Korean Patent Application No. 10-2017-7009701, 9 pages including English translation.
Extended European Search Report dated Apr. 11, 2018, for European Patent Application No. 15839305.8, 8 pages.
KIPO Refusal Decision dated Sep. 19, 2018, for Korean Patent Application No. 10-2017-7009701, 7 pages including English translation.
Office Action dated Dec. 20, 2018, for Korean Patent Application No. 10-2018-7030431, 5 pages including English translation.

\* cited by examiner

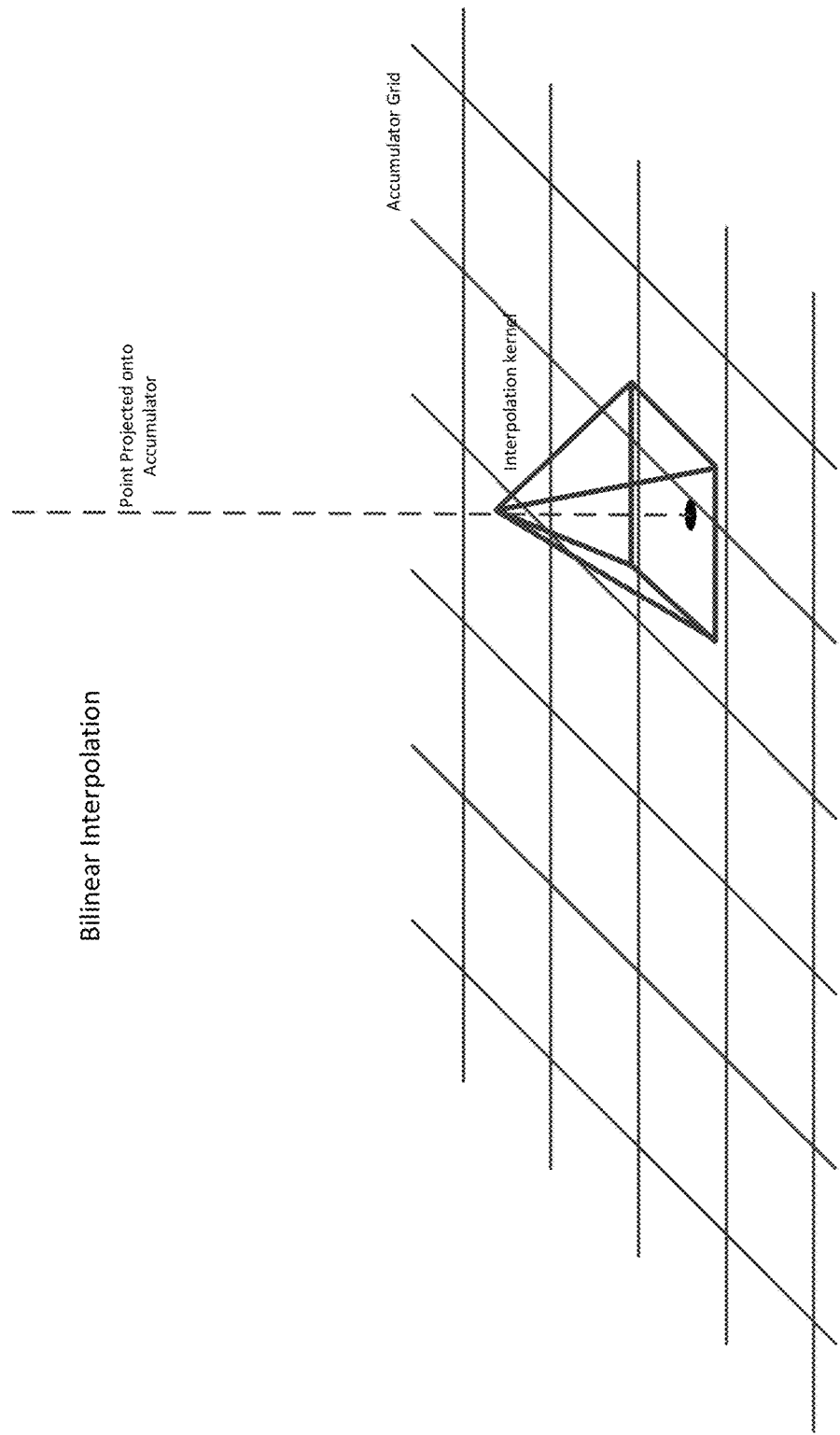

POINT CLOUD MERGING FROM MULTIPLE CAMERAS AND SOURCES IN THREE-DIMENSIONAL PROFILOMETRY

CROSS-REFERENCE TO RELATED APPLICATION

The present application is based on and claims the benefit of U.S. Provisional Application Ser. No. 62/048,933, filed Sep. 11, 2014, the content of which is herein incorporated in its entirety.

BACKGROUND

Aspects of the present invention are related to the generation of a composite surface profile of an object based on image data from a plurality of cameras and structured lights sources using principles of triangulation.

Circuit boards that carry electronic integrated circuits and discrete electronic components are well known. A circuit board substrate is prepared with predetermined conductor paths and pads for receiving the leads of electronic components such as integrated circuit chips, resistors or capacitors. During the circuit board assembly process, solder paste deposits are placed onto the board substrate at appropriate positions. The solder paste deposits are usually applied by placing a stencil screen onto the substrate, applying solder paste through the stencil openings and removing the stencil from the substrate. The circuit board electronic components are then positioned onto the substrate, preferably with a pick and place machine, with leads of the electronic components placed on the respective solder paste deposits. The circuit board is passed through an oven after all of the components are positioned on the substrate to melt the solder paste deposits thus creating an electrical as well as mechanical connection between the components and the substrate.

The size of the solder paste deposits and electronic components and the accuracy with which they must be placed on the substrate has become increasingly smaller and tighter with the increased emphasis on miniaturization in the electronics industry. Solder paste deposit heights can be as small as 50 microns and the height of the solder paste brick must often be measured to within 1 percent of the designed height and size. The center-to-center spacing between solder bricks is sometimes as little as 200 microns. Too little solder paste can result in no electrical connection between the lead of an electronic component and the pad of the circuit board substrate. Too much paste can result in bridging and short-circuiting between the leads of a component. Discrete electronic components such as resistors and capacitors can be as small as 200×400 microns and leads on micro ball grid array components can have a center-to-center spacing less than 300 microns.

A single circuit board can cost thousands and even tens of thousands of dollars to manufacture. Testing of a circuit board after the fabrication process is complete can detect errors in solder paste placement and component placement and lead connection, but often the only remedy for a faulty board is rejection of the entire board. In addition, with the miniaturization of components, visual inspection of the circuit board, even with optical magnification, is unreliable. It is accordingly imperative that a circuit board be inspected during the fabrication process so that improper solder paste deposits can be detected prior to the placement of the electronic components onto the substrate. Such in-process solder inspection reduces the cost of failure since expensive components have not yet been placed onto the circuit board.

After placement, it is also important to inspect the components to ensure proper placement of the components Improperly placed components, missing components or poor solder joints are typical defects introduced during the placement of the components and reflow of the solder paste. After reflow, proper placement of the components and the quality of the reflowed solder junctions can be inspected using an automated optical inspection system to ensure that all components are properly soldered and connected to the circuit board. Current optical inspection systems use two-dimensional video images of the circuit board to detect defects. However, optical inspection systems that detect three-dimensional height images of the circuit board make possible or otherwise improve the detection of placement defects such as lifted leads, package coplanarity, and component tombstones and billboards.

One type of three-dimensional inspection system uses phase profilometry. Typically, phase profilometry systems use a single camera and projector. When multiple cameras are used, however, the user would need to merge the resulting point clouds with tools such as the Point Cloud Library (PCL), which is an open source computer vision library. While the PCL is quite powerful, it is too slow for use in high speed automated inspection systems, such as those listed above.

SUMMARY

A computer-implemented method of and system for measuring a three-dimensional surface are provided. The method includes projecting structured illumination on the surface and acquiring a plurality of sets of images. The sets of images are processed to obtain a plurality of point clouds. A spatial accumulator is defined. A first point cloud of the plurality of point clouds is combined with a second point cloud of the plurality of point clouds into the spatial accumulator. Spatial coordinates of the surface are generated based on the contents of the spatial accumulator.

BRIEF DESCRIPTION OF THE DRAWINGS

FIG. 12 shows how the signal for the projected pixel is apportioned onto the grid in accordance with an embodiment of the present invention.

DETAILED DESCRIPTION OF ILLUSTRATIVE EMBODIMENTS

The use of white light phased profilometry is a well-known technique for optically acquiring topological surface height images of circuit boards. An example system that projects sinusoidal fringe patterns to generate a 3D profile is recited in U.S. Pat. No. 6,750,899. A three-dimensional profile or height map may be generated by projecting various structured light patterns from a source onto an object, recording the patterns with one or more cameras, and processing the images appropriately. The patterns, as viewed by various cameras, are modulated by the shape of the object. The modulation of the patterns is analyzed to generate a three-dimensional point cloud. As used herein, a "point cloud" is a set of data points in some coordinate system as well as at least one additional data point indicative of a quality metric. In a three-dimensional coordinate system, points are usually defined by X, Y, and Z coordinates. An example system that projects sinusoidal fringe patterns to generate a 3D profile is recited in U.S. Pat. No. 6,750,899.

Steep slopes and recessed features in the inspected object can cause shadows and occlusions, so it is desirable to combine a plurality of point clouds in order that the lacunae in one reconstruction may be filled in from another reconstruction. An example three-dimensional fringe projection apparatus is described below with respect to FIG. 2.

A structured light pattern may undergo multiple reflections from the object before it is imaged by the cameras. These reflections can cause severe errors, or noise, in the point cloud that is created based on the images. Multiple reflections are made worse by shiny or specular objects.

Figure 1:
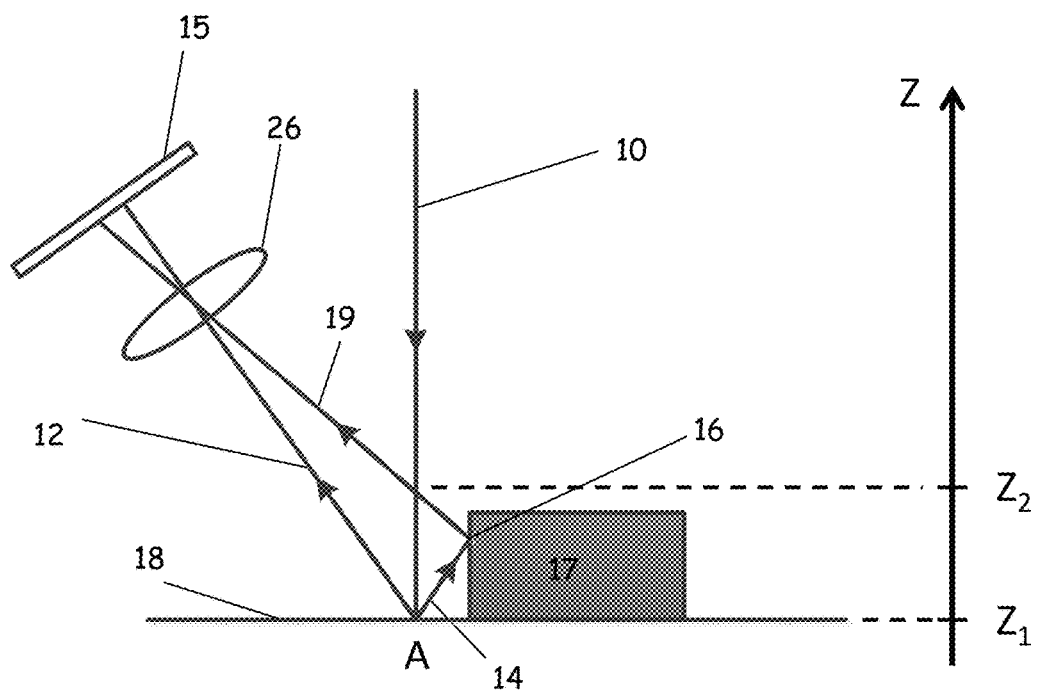
FIG. 1 illustrates a multiple reflection problem for which embodiments described herein are particularly suited.

FIG. 1 illustrates the multiple-reflection problem. Incident structured illumination is shown at line 10, which reflects off of surface 18 at a point A which has a Z coordinate value of $Z_1$. A portion 12 of the reflected structured illumination passes through optics 26 and is detected by detector 15. However, another portion 14 of the reflected incident illumination reflects off surface 16 of object 17 as line 19. This multiple reflection illumination also passes through optics 26 and is detected by detector 15. If the intensity of the multiple reflection illumination along line 19 is much greater than the direct reflection illumination along line 12, then the reported Z coordinate for point A will be $Z_2$ where line 19 intersects incident illumination line 10. Thus, the multiple reflection illumination is a source of error in the process.

Point cloud denoising methods exist, but since the usual phase-profilometry reconstruction process can greatly amplify noise in weak data, it is highly desirable to de-weight weak data at an early stage of the processing, before it can cause problems. Furthermore, conventional techniques for removing bad points tend to be ineffective due to a large percentage of data that may be corrupt because of occlusions and multiple reflections. What is needed is an improved method for merging point clouds to dramatically reduce point cloud errors, especially for shiny objects and areas of partial occlusion.

Figure 2:
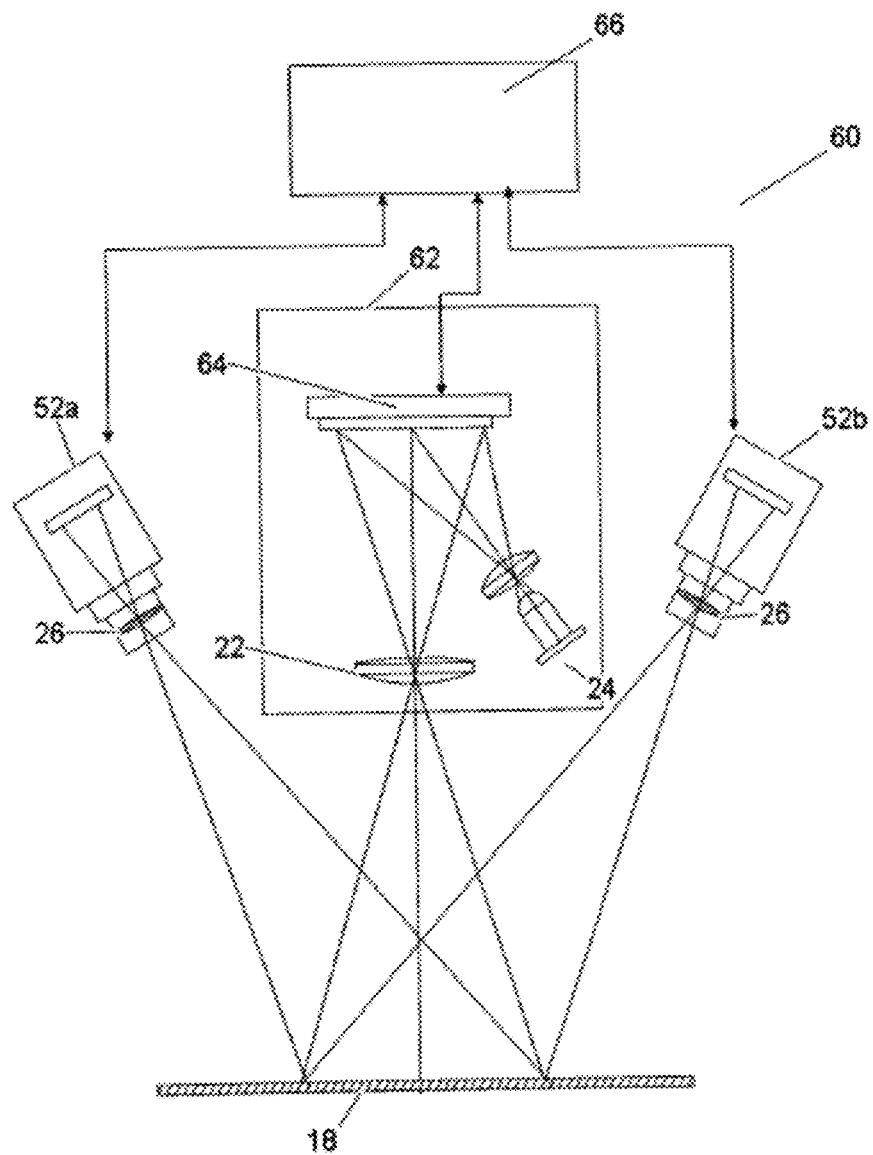
FIG. 2 is a diagrammatic view of a multiple imaging device height image sensor for three-dimensional imaging of a circuit board using phased structured light in accordance with an embodiment of the present invention.

FIG. 2 is a diagrammatic view of a multiple imaging device height image sensor 60 for three-dimensional imaging of circuit board 18 using phased structured light in accordance with an embodiment of the present invention. A pattern projection source 62 is coupled to controller 66 and projects structured light pattern 30 (shown in FIG. 3) onto circuit board 18 by imaging a spatial light modulator (SLM) 64 with imaging lens 22. In one embodiment, SLM 64 is a digital micromirror device (DMD) available from Texas Instruments (e.g. TI part number DLP5500). This device incorporates an array of digital micromirrors which are individually addressable to form an arbitrary image on the surface. In operation, the required structured light pattern is programmed on the DMD array. The programmed image causes each of the micro mirrors to tilt to one of two positions which correspond to the pixel intensity value of the image at the individual mirror's location. For pixels that are high brightness, the tilted DMD reflects the light from light source 24, through imaging lens 22 to the circuit board 18 producing a bright pixel. For pixels that correspond to low brightness in the structured light pattern 30, the tilt of the DMD mirror reflects light from light source 24 away from the imaging lens 22 producing a dark pixel in structured light pattern 30. By changing the programmed image sent to the DMD, the required sequence of phase-shifted images can be generated. SLM 64 is illuminated using bright light source 24 such as a white light LED. Two cameras 52a, 52b are coupled to controller 66 and are configured to simultaneously acquire an image of the circuit board 18 illuminated with structured light pattern 30. Cameras 52a, 52b can be any one of several image sensing technologies used in machine vision such as CCD or CMOS detectors coupled with imaging lens 26 that images circuit board 18 unto the detector. The difference between the optical axis incidence angles of pattern projection source 62 and the cameras 52a, 52b represents the triangulation angle of the height sensor.

In operation, light source 24 illuminates SLM 64 and pixels that are programmed with high brightness values reflect light through imaging lens 22. Imaging lens 22 projects the light from SLM 64 onto the circuit board 18. Simultaneously, both cameras 52a, 52b acquire a first image of the circuit board 18 during the illumination period. The projection pattern programmed into SLM 64 is then changed to a second sinusoidal pattern with a relative phase shift of an equivalent distance of a fractional phase distance of the first sinusoidal pattern and cameras 52a, 52b acquire a second image. Finally, the projection pattern programmed into SLM 64 is then changed to a third sinusoidal pattern with a relative phase shift of an equivalent distance of a fractional phase distance of the first and second sinusoidal patterns and cameras 52a, 52b acquire a third image.

Using SLM 64 to generate a sequence of structured light images has advantages over using a mechanically shifted chrome-on-glass reticle. With a chrome-on-glass reticle, structured light pattern 30 is fixed with the chrome-on-glass pattern and sequences of images with differing phases are generated by physically moving the reticle. Physically moving the reticle is costly and requires motion components that are prone to mechanical wear and ultimately failure. In addition, it is often required to change the sinusoidal pattern's period. By changing the sinusoidal pattern's period, the height range and height resolution of the height image sensor can be adjusted. Changing the height range of the sensor is particularly important when inspecting a circuit board after components have been placed since the height of the placed components can be higher than the height range of the sensor which is determined by the reticle pattern. Changing the chrome-on-glass reticle pattern requires physically replacing one reticle with another which typically cannot be accomplished during operation of the sensor.

With SLM 64, various patterns can be projected unto circuit board 18 simply by programming an array of numbers into the controller 66. Projecting an image sequence with varying phases is simply accomplished by programming successive images to controller 66. By addressing the successive images from controller 66 memory, a sequence of phase images is projected without physically moving the reticle. In addition, by changing the phase period of the pattern programmed to controller 66, the height resolution and height range of height imaging sensor 62 can be changed during the operation of the sensor.

Figure 3:
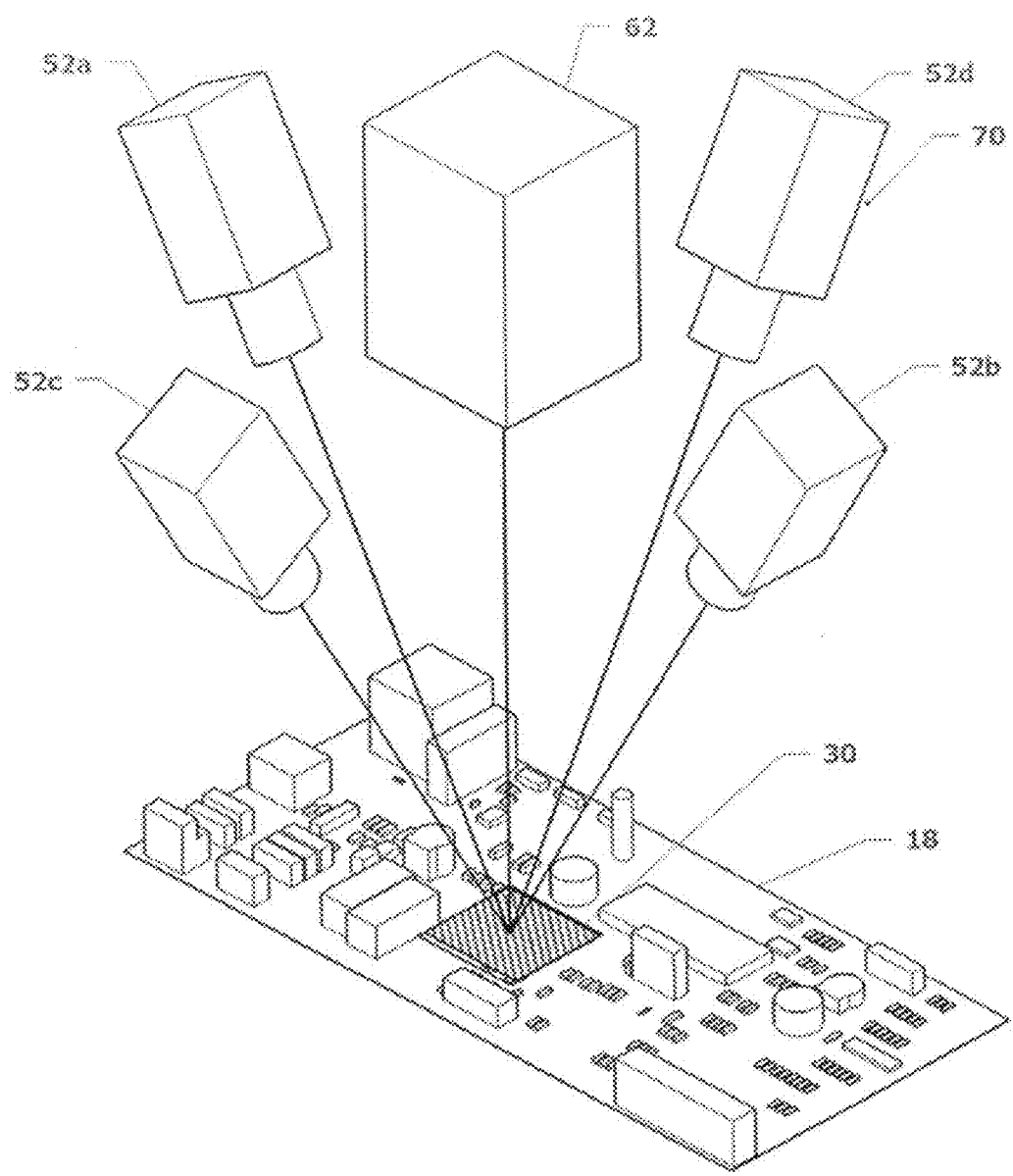
FIG. 3 is a diagrammatic view of a multiple imaging device height image sensor for three-dimensional imaging of a circuit board using phased structured light in accordance with an embodiment of the present invention.

FIG. 3 is a diagrammatic view of a multiple imaging device height image sensor 70 for three-dimensional imaging of a circuit board using phased structured light in accordance with another embodiment of the present invention. In this embodiment, four cameras 52*a*, 52*b*, 52*c*, 52*d* are configured to simultaneously acquire images of sinusoidal structured light pattern 30 on circuit board 18 from four distinct incident angles. Each of the four cameras' 52*a*, 52*b*, 52*c*, 52*d* incident angles form a triangulation angle relative to the projection incident angle of pattern projection source 62. Pattern projection source 62 projects sinusoidal structured light pattern 30 onto circuit board 18. Cameras 52*a*, 52*b*, 52*c*, 52*d* are preferably triggered simultaneously to acquire an image of the sinusoidal pattern 30. Pattern projection source 62 projects a second sinusoidal pattern with a relative phase shift of an equivalent distance of a fractional phase distance of the first sinusoidal pattern and the four optical image sensors 52*a*, 52*b*, 52*c*, 52*d* are triggered simultaneously to acquire a second set of images. Finally, the projection pattern programmed into pattern projection source 62 is then changed to a third sinusoidal pattern with a relative phase shift of an equivalent distance of a fractional phase distance of the first and second sinusoidal patterns and cameras 52*a*, 52*b*, 52*c*, 52*d* each acquire a third image. While four cameras are shown with a single projector in FIG. 3, embodiments of the present invention also include multiple projectors operating in conjunction with a single camera. Further, embodiments of the present invention also include multiple cameras operating with multiple projectors. The images are sent to controller 66 which processes the images sets into a height image.

Figure 4:
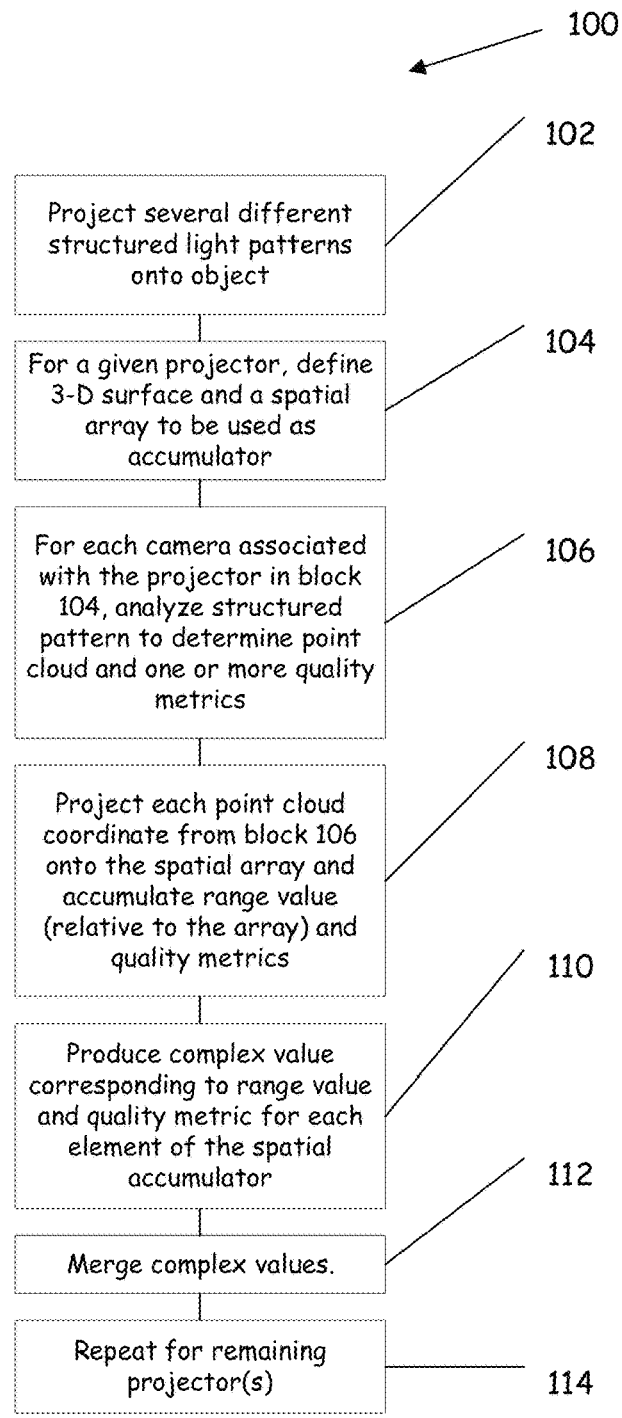
FIG. 4 is a flow diagram of a method of merging point clouds in accordance with an embodiment of the present invention.

FIG. 4 is a flow diagram of a method of merging point clouds in accordance with an embodiment of the present invention. Method 100 begins at block 102 where several different structured light patterns are projected onto an object from one or more directions. Each of those projected patterns is imaged with one or more cameras. Next, at block 104, for a given projector, a three dimensional surface is defined and a spatial array on that surface is used as a spatial accumulator. At block 106, for each camera associated with the projector in block 104, the structured pattern images are analyzed using the calibrated geometry of the system to determine a point cloud consisting of three-dimensional object coordinates and one or more quality metrics corresponding to the camera pixels. At block 108, each point cloud coordinate from block 106 is mathematically projected onto the spatial accumulator, which accumulates the range value (relative to the spatial array) and the quality metrics associated with the range value. At block 110, a complex value is produced corresponding to the range value and the quality metrics for each element in the spatial accumulator. Next, at block 112, the complex values are merged for each element of the spatial accumulator to produce a single range value and a single quality metric for each element of the spatial accumulator. Various methods can be used for the merge as long as the result is a single point cloud that reduces or eliminates the effects of occlusions and/or multiple reflections in the point cloud information. At block 114, the method is repeated for other projectors until it has been performed with respect to all projectors.

Figure 5:
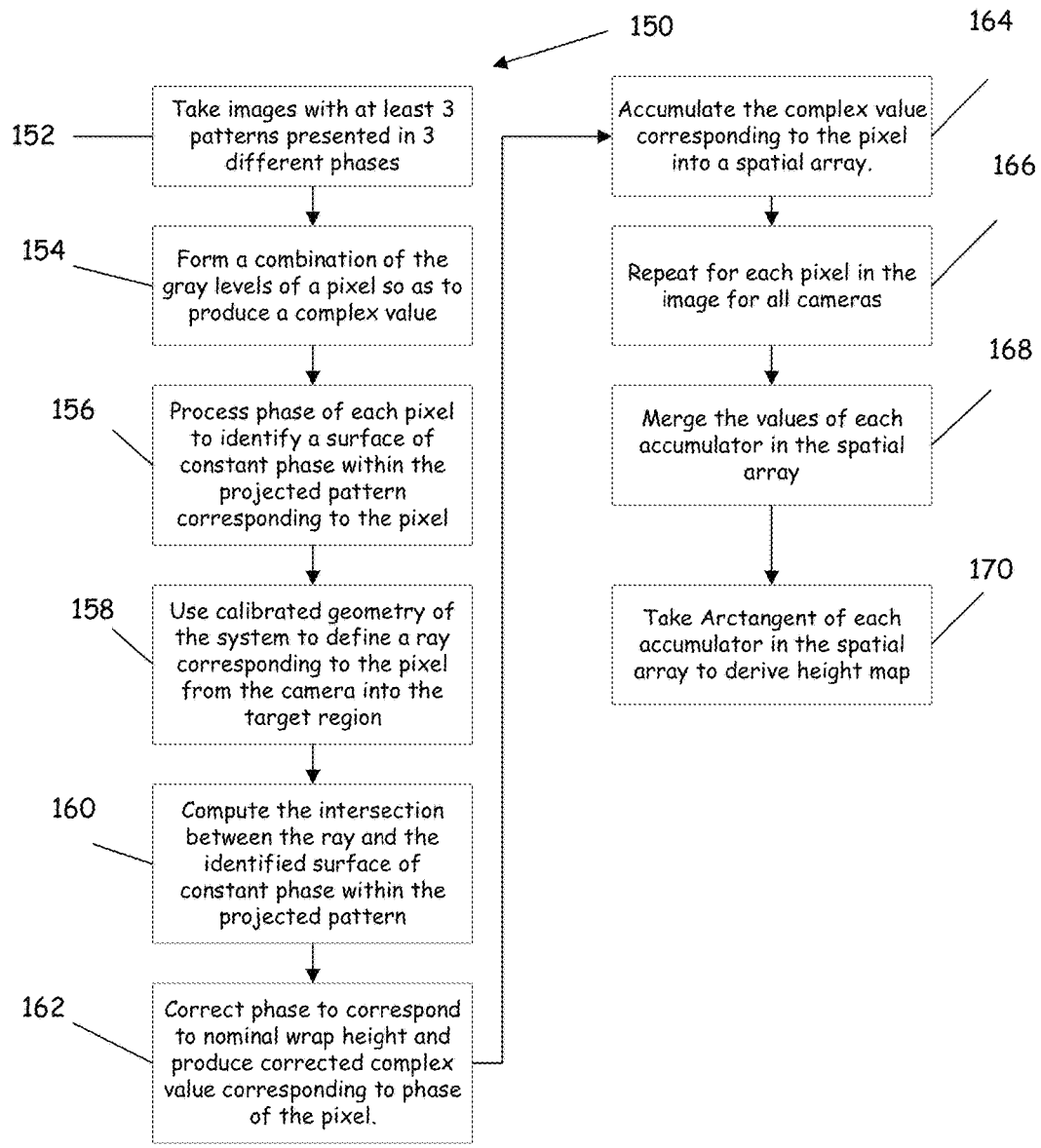
FIG. 5 is a flow diagram of a method of acquiring multiple point clouds and merging them together in accordance with an embodiment of the present invention.

FIG. 5 is a flow diagram of a method of acquiring multiple point clouds and merging them together in accordance with an embodiment of the present invention. Method 150 begins at block 152 where at least three distinct patterns are sequentially projected onto a surface to be measured and images thereof are acquired by a plurality of cameras. Preferably, the patterns are a sinusoidal fringe pattern presented in three different phases. Next, at block 154, a combination of the gray levels of a pixel is formed so as to produce a complex value (represented in rectangular coordinates e.g. z=u+iv or in polar coordinates of a magnitude and phase). Preferably, the magnitude of the complex value represents the quality of the value and the phase represents spatial information for the observed pattern (e.g. phase of the projected sine wave). At block 156, the phase of the pixel is processed to identify a surface of constant phase within the projected pattern corresponding to the pixel. At block 158, the calibrated geometry of the system is used to identify a ray corresponding to the pixel from the camera into the target region. Next, at block 160, the intersection between the ray (block 158) and the identified surface (block 156) is computed to determine a unique three-dimensional coordinate of the observed point corresponding to the pixel. At block 162, the phase is corrected to correspond to a nominal wrap height and to produce a corrected complex value corresponding to the phase of the pixel. Block 162 is only required in embodiments that employ multiple cameras which must be normalized to a common height scale. At block 164, the complex value corresponding to the pixel is accumulated into the spatial array. At block 166, blocks 154-164 are repeated for each pixel in the image for all cameras. It should be noted that additional sets of patterns can be projected and additional point clouds can be generated for a particular pattern set for each camera and projector pair. For example, the direction of the fringe pattern sets can be changed and additional point clouds generated for each camera and projector pair. As defined herein, a pattern set is a number of images acquired using a particular pattern where the set contains sufficient image information to generate a single point cloud. Once block 166 completes, method 150 continues at block 168 where the values of each accumulator in the spatial array are merged. This merge can be performed in accordance with any suitable technique. Some exemplary techniques include, without limitation, an algebraic summation or a geometric median Finally, at block 170, the arctangent of each accumulator in the spatial array is taken in order to derive a range map for the surface.

After each pixel has been processed for a given camera and projector pair, one is possessed of a point cloud of values (x,y,z,r,m). r is the normalized reflectance and m is the fringe modulation (contrast) as defined by equation (1) in U.S. Pat. No. 6,750,899. Each point has a 3D coordinate (x,y,z) along with reflectance value and a modulation value. This point cloud could be used directly by any number of schemes or techniques (see Jagan Sankaranarayanan, Hanan Samet, and Amitabh Varshney. "A fast all nearest neighbor algorithm for applications involving large point-clouds."

Computers & Graphics 31, (2) (2007), 157-174, Ruwen Schnabel, Roland Wahl, and Reinhard Klein. "Efficient RANSAC for Point-Cloud Shape Detection." Computer Graphics Forum. 26, 2 (2007)) to discern the true shape of the object. The referenced papers attempt to reduce or eliminate errors or missing data in the point cloud. These problems are often caused by occlusions or multiple reflections.

A limitation of prior techniques is the enormous computational burden that is required to meet the significant speed requirements of modern printed circuit board assembly lines. Accordingly, a much faster approach was required in order to serve printed circuit board manufacturing industries. Embodiments disclosed herein project the point cloud onto a grid of points known as a spatial accumulator. In one embodiment, the spatial accumulator is a 2-dimensional plane roughly parallel to the spatial extent of the points. In these embodiments, the spatial accumulator is configured to store complex values where the magnitude of the value represents some quality measure and the phase represents distance from some reference surface (typically a plane).

Figure 11:
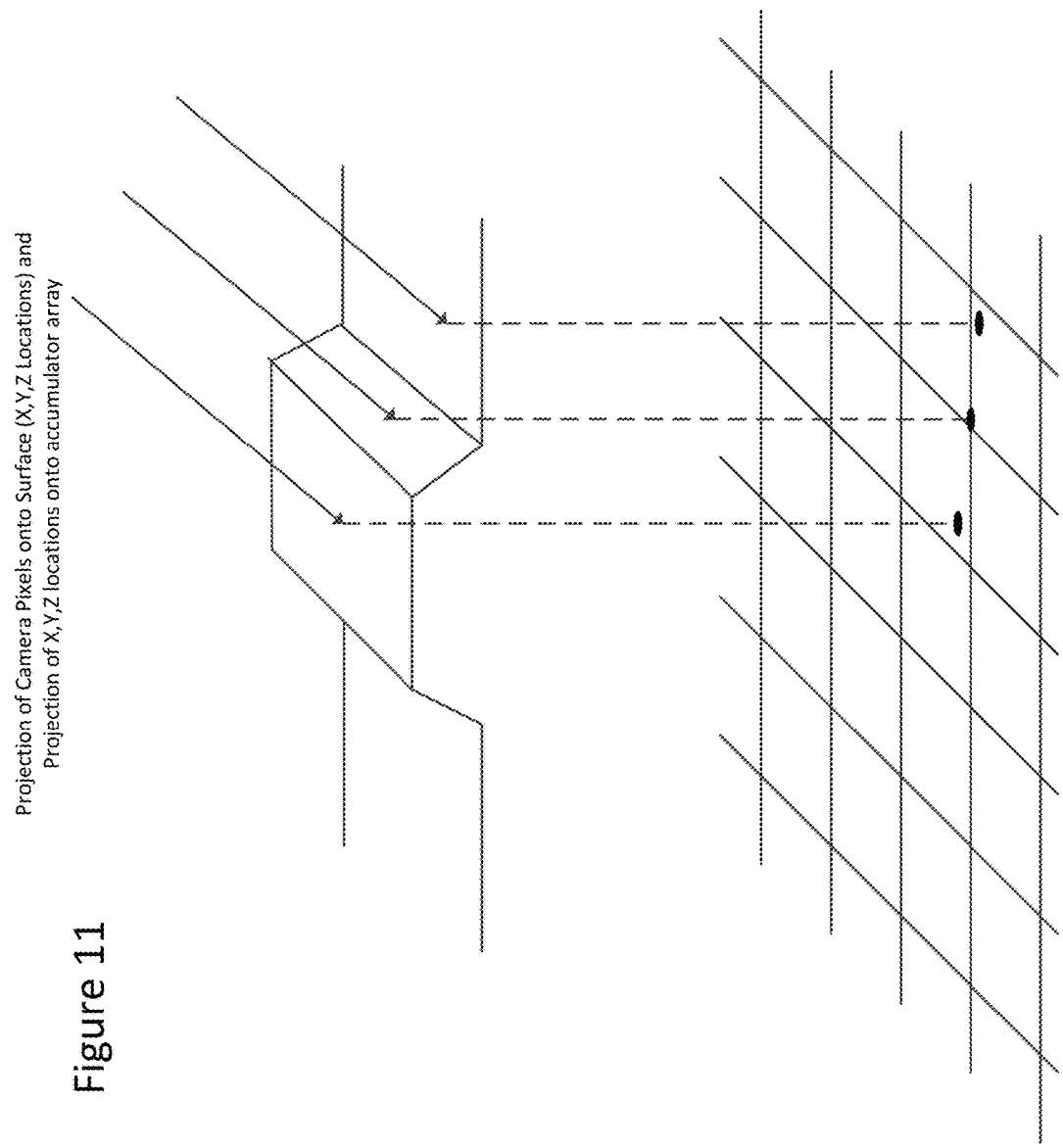
FIG. 11 shows the intersection of three camera pixels with a surface to be measured in accordance with an embodiment of the present invention.

The projection process produces an irregular grid of pixels, with the irregularity being caused partially by the oblique geometry and partially by the non-flat topography. Pixels whose x-y coordinates do not lie exactly on the grid of the 2-D spatial accumulator are interpolated by a suitable anti-aliasing kernel, such as the pyramid kernel associated with bilinear interpolation. As an example of the projection process, FIG. 11 shows the intersection of three camera pixels with a surface to be measured. The intersection of the camera pixel ray with a measured projection pattern position allows the determination of a calibrated X, Y, Z location of the intersection. Each of these points is then projected onto the accumulator grid. For the case shown, the grid is a plane roughly parallel to the spatial extent of the points. However, embodiments described herein are not limited to measuring roughly flat surfaces. The main requirement for an effective accumulator grid is for each accumulator in the grid to combine estimates of some spatial location. If the grid is excessively oblique, for example, pixels from widely-separated spatial points might be unwittingly combined into a single accumulator. In practice, the accumulator grid could be tilted or warped to any shape convenient for the measurement process. In general, the camera pixels as projected onto the accumulator grid will not be exactly located at the grid points. If the pixel value is simply added to the nearest accumulator grid point, the error incurred in the rounding of the spatial location would cause noise in the reconstruction, similar to the well-known anti-aliasing problems that are encountered in rendering a scene to a raster device. To avoid this problem, each pixel should be convolved with a subtle reconstruction (anti-aliasing) kernel prior to accumulation. FIG. 12 shows how the signal for the projected pixel is apportioned onto the grid; in this example a bilinear interpolation kernel is applied. Each of the pixels neighboring the projected point is incremented by the complex value of the projected point multiplied by the area of the kernel in that pixel. The process is repeated for each projected camera pixel, thereby providing a simple and fast weighting and complex addition to the accumulator grid. A number of advantages of this simple addition into the accumulator grid are provided as will be described below. The method itself is distinct from the "splatting" process that is used to generate images of three-dimensional objects since there is no need to traverse the point cloud in an ordered direction (e.g. from low to high) and since there is no overwriting of existing values in the accumulator with new values. For each camera and set of projected patterns, an estimate is provided of the surface shape and the spatial accumulator is populated with a surface estimate.

The estimators may be projected onto some suitable surface other than a plane. For instance, if the target object is expected to be a sphere, the estimators may be projected onto a sphere, with the parameters of the sphere adjusted to best fit the estimators.

An easy way to produce a height image is to average the height estimates from each camera at any X, Y location. The main advantage of this technique is simplicity, but does little to help in suppressing or eliminating the effects of multiple reflections.

In one embodiment, the complex values (u+iv) in each element of the spatial accumulator may be summed, where u and v are the real and imaginary components of the complex pixel value. (Alternatively, the complex pixel may be represented as a vector of length $\sqrt{(u^2+v^2)}$ and phase angle of atan2(u,v)). In an embodiment that uses sinusoidal fringe projection, the range value, for a given pixel is encoded as a function of the phase value. In one embodiment, the quality metric is defined as Q=r×m which assigns more weight to pixels with higher reflectance and fringe contrast. In this embodiment, the phase of the complex point value encodes the height of the point (or distance from the nominal zero position for the spatial accumulator).

Figure 6:
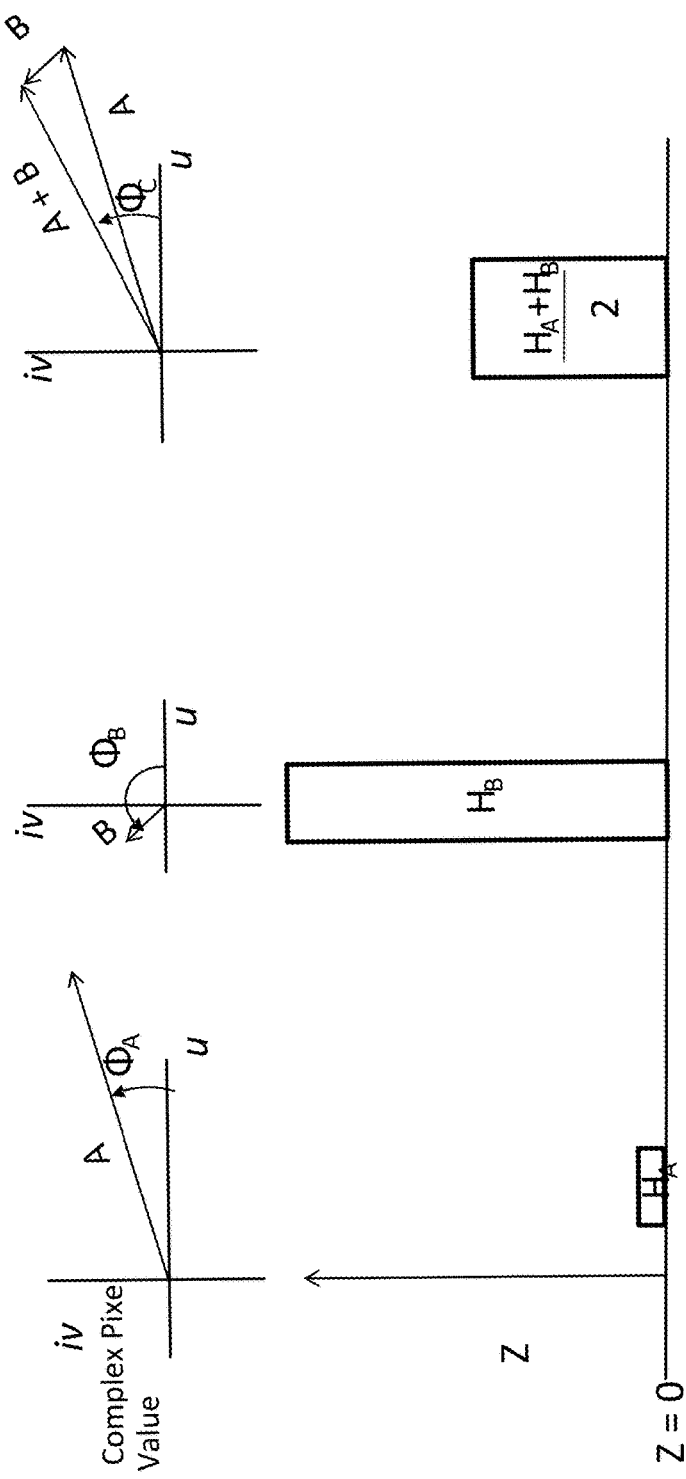
FIG. 6 is an example where the complex values from the same X-Y location for two cameras A&B are plotted.

Summing in the complex plane automatically de-weights a pixel with a low quality estimate. FIG. 6 is an example where the complex values from the same X-Y location for two cameras A&B are plotted. A strong signal 'A' from camera A has height encoded as phase angle $\Phi_A$ and vector length of $Q_A$ and a weak signal 'B' from camera B has height encoded as phase angle $\Phi_B$ and vector length of $Q_B$. If the signals from cameras A&B are simply converted to height and averaged, the result is a level midway between heights HA and HB. Adding the vectors in the complex domain produces a result which is dominated by the strong signal (vector 'A') with only a small contribution from the weaker signal (vector 'B') with a resulting height encoded as phase angle $\Phi_{CB}$.

Figure 7:
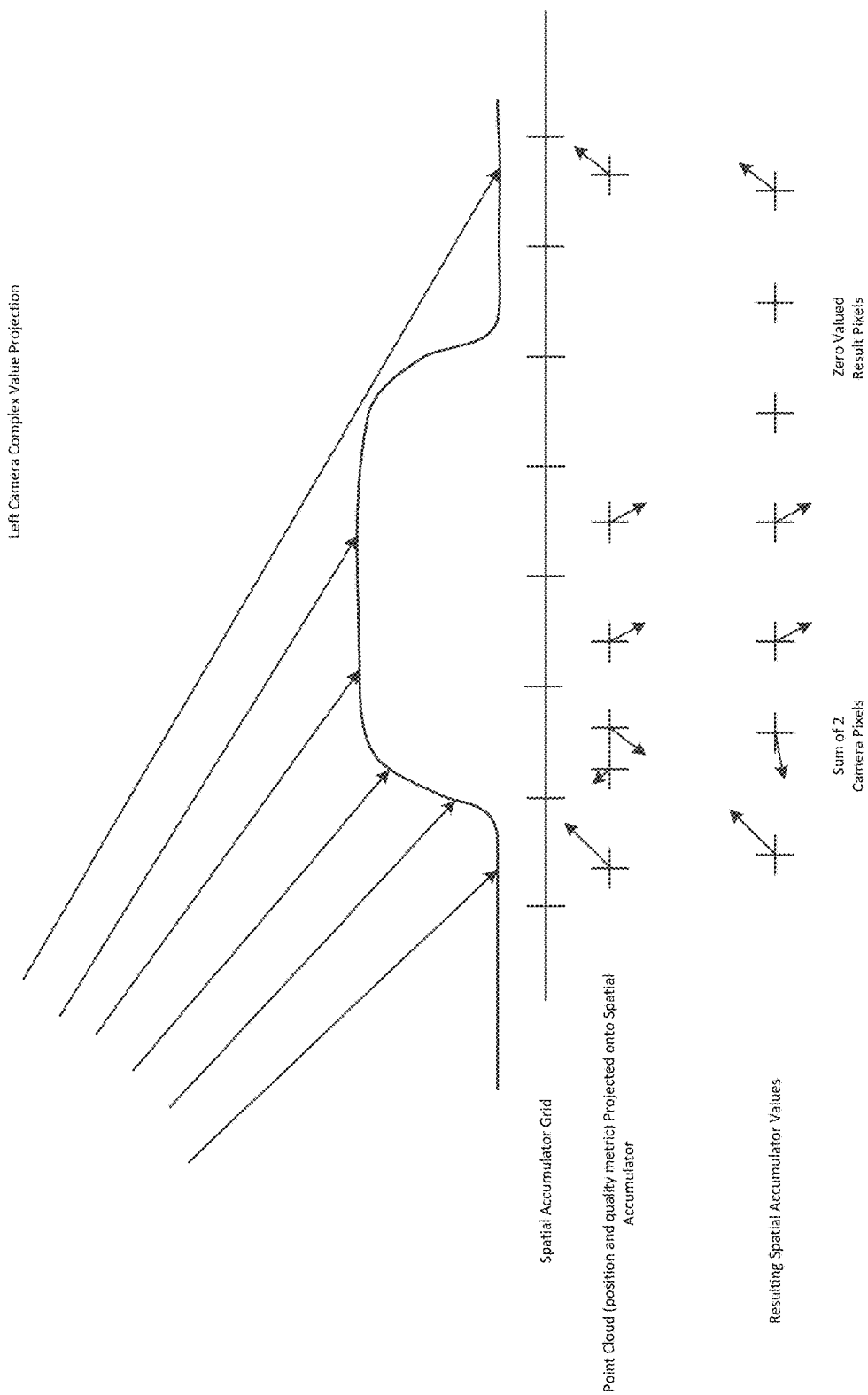
FIG. 7 illustrates the advantage of using complex values in an oblique viewing camera when projecting onto a regular spatial accumulator grid in accordance with an embodiment of the present invention.

FIG. 7 illustrates the advantage of using complex values in an oblique viewing camera when projecting onto a regular spatial accumulator grid. The top illustration shows how an obliquely camera's pixels might map onto an irregular surface topology. Each pixel views a point on the target where the spacing between the points depends on the local topology of the target. In an embodiment where sinusoidal fringe patterns are projected, each pixel can measure phase projected onto the surface (projector not shown) and a quality metric. The second portion of FIG. 7 shows the measured complex values, at each pixel location a vector plot is drawn where the horizontal axis in the real (u) and the vertical axis is the imaginary (iv) component of the signal at that pixel. The vector plots for each pixel are drawn at their appropriate lateral location. The operation begins with the measured image complex values and an output complex image which has been cleared (set to 0). For simplicity, this operation is described using a nearest neighbor sampling technique instead of the more correct position interpolation technique (e.g. the bilinear filter described above). In nearest neighbor sampling, camera pixels are projected to the nearest neighbor spatial grid location. Looking at each camera pixel in turn as they are added to the accumulator: (1) The left-most pixel is simply added to the appropriate location in the accumulator; (2) The next two pixels are both nearest the same accumulator position, they are in turn added to the accumulator (because we are working with complex valued data, this sum acts much like a weighted average of the phase values); (3) The next three pixels in this example all land in unique accumulator locations. Note, two accumulator grid points did not have any data mapped to them; these grid locations retains zero values (marked as having no signal strength).

Figure 8:
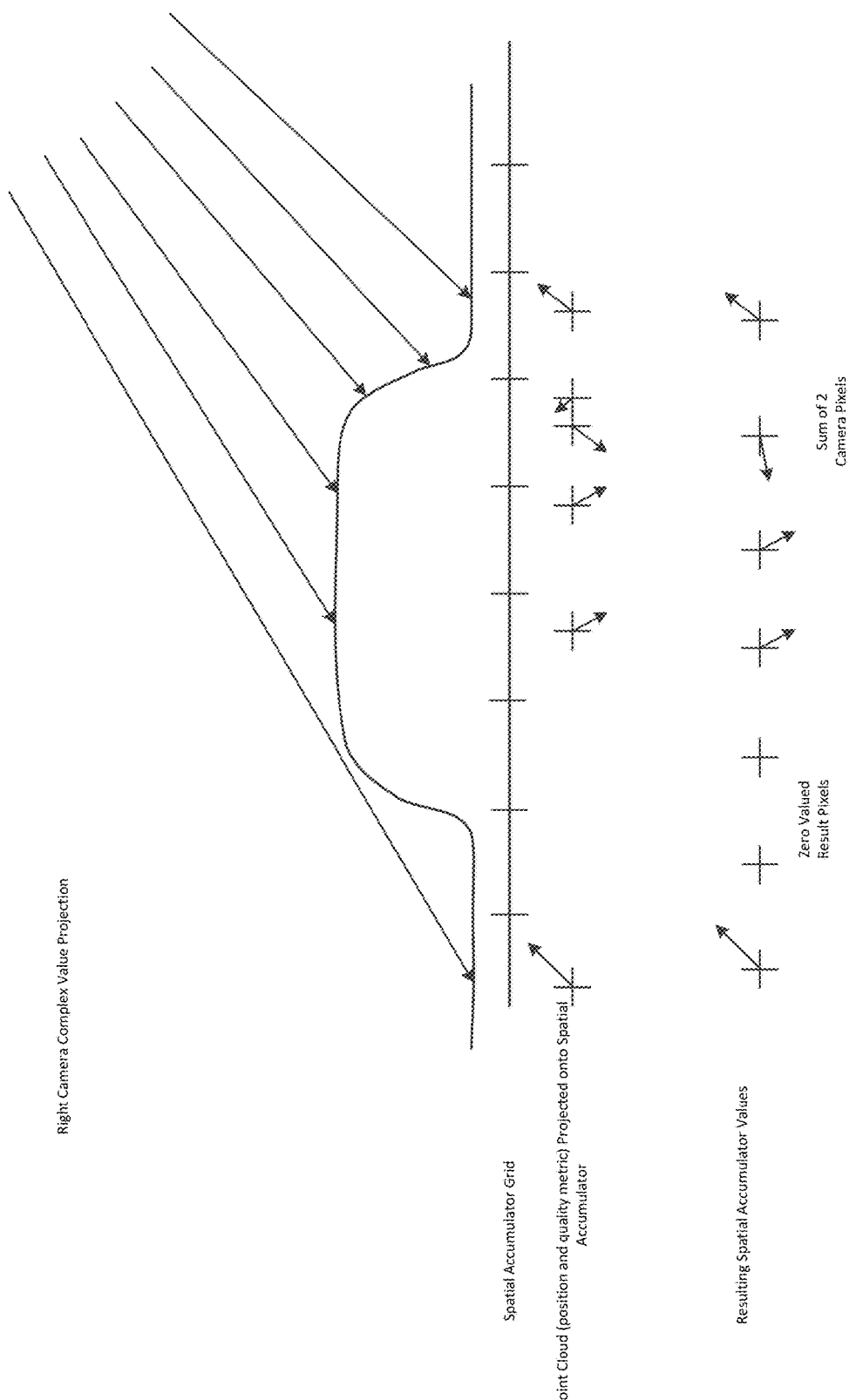
FIG. 8 shows the same object and projected pattern being viewed by a camera from the right side.

A second camera may also view the same object and be processed in the same manner. FIG. 8 shows the same object and projected pattern being viewed by a camera from the right side. Again, camera pixels are shown mapping onto the surface along with the complex signal for each camera pixel. The camera pixel locations are then projected onto the spatial accumulator grid. Note that pixel positions missed by the left camera may be viewed by the right camera and vice versa to fill in areas of occlusion.

Figure 9:
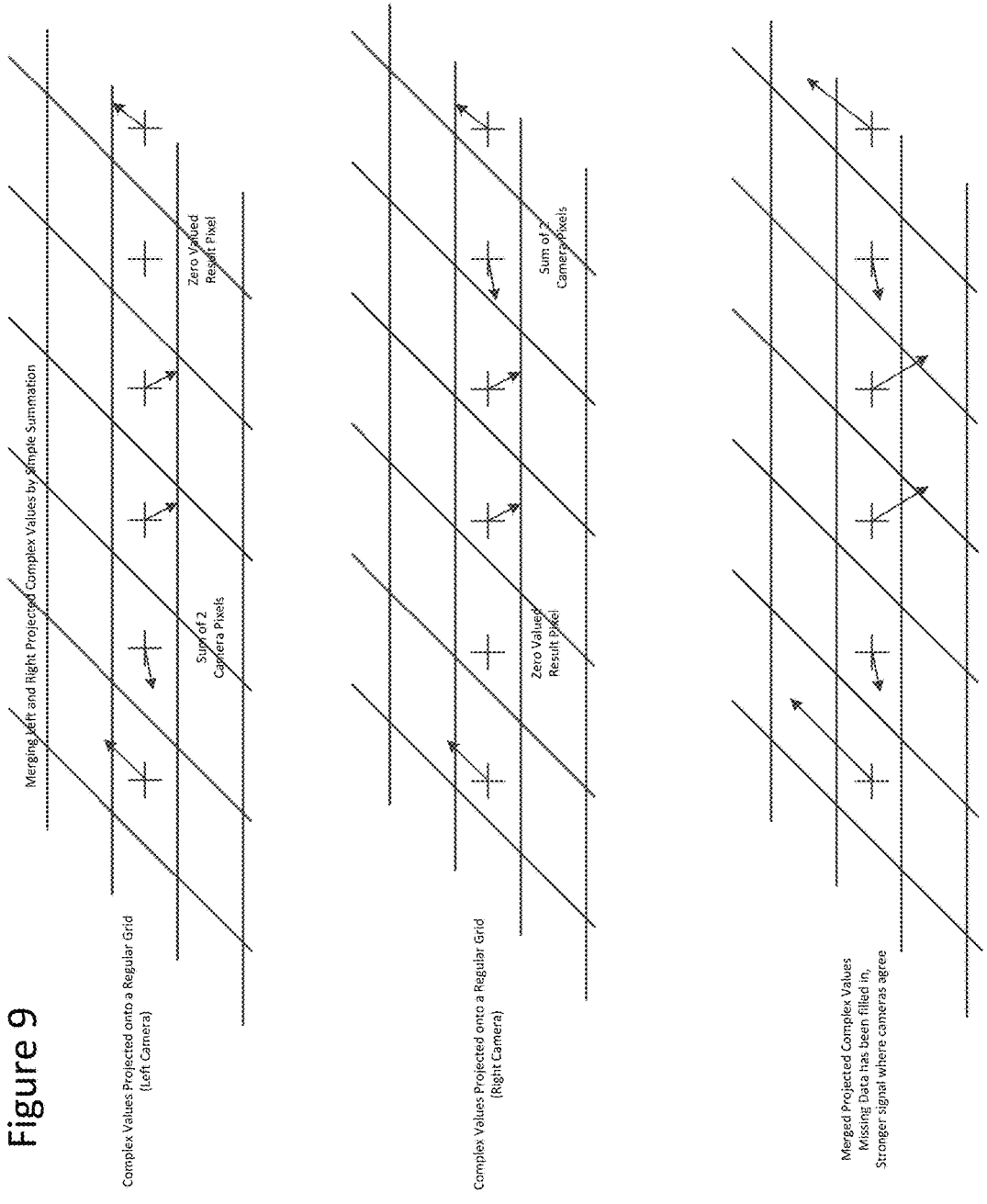
FIG. 9 shows merging of complex values from multiple camera views along a single line in the spatial accumulator in accordance with an embodiment of the present invention.

FIG. 9 shows merging of complex values from multiple camera views along a single line in the spatial accumulator. Other complex values of the spatial accumulator are omitted for clarity. The top row of plots in FIG. 9 are the complex values observed by the left camera, the second row of plots are the values from the right camera. If only two cameras are available, then the most straight-forward method of combining the images is to simply add the complex values, shown on the third row of plots. Note that missing values have been filled in and data points where all cameras are in agreement produce stronger signals.

It has been found advantageous in practice to combine the spatial accumulators of several cameras by using non-linear techniques (not the simple addition of complex values). Such schemes include: using a geometric median and voting. In the geometric median approach, the individual complex values may be combined by the so-called geometric median or $L_1$ estimator, which is the location in the complex plane that minimizes the sum of the Euclidean distances to the points. The advantage of this scheme is superior resistance to outliers. The voting approach uses a best estimator while the others are discarded. A number of robust estimators have been described in statistical literature, typical techniques may discard outliers (e.g. truncated mean) or de-weight outliers (e.g. Winsorized mean). Effectively, these tools vote out those points deemed inaccurate.

Figure 10A:
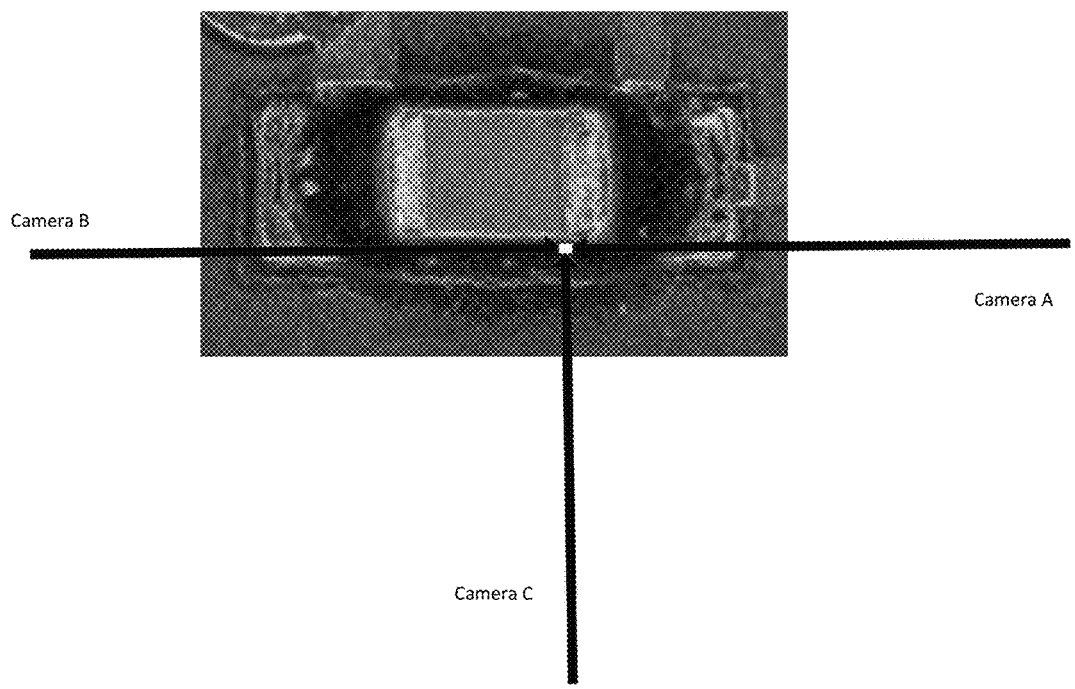
FIGS. 10A and 10B show the advantage on a non-linear mixing of the results of several cameras, in this case the geometric median.
Figure 10B:
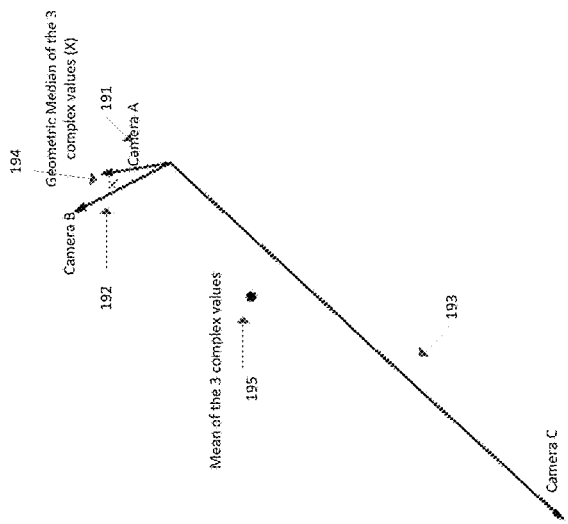

FIGS. 10A and 10B show the advantage on a non-linear mixing of the results of several cameras, in this case the geometric median. Actual results for a single accumulator location are shown; cameras A and B get relatively good samples of a point near a tall chip capacitor, camera C's results are disrupted by a multiple reflection of light reflecting off the side of the capacitor. In the plot, the length of the vectors (magnitude of the complex values) represents the signal strength for each camera, the direction of the vectors (the angle of the complex values) represents the height estimate for each camera. The plot of complex values shows similar results for cameras A 191 and B 192 while camera C 193 has a very strong but wrong value. Simply taking the mean 194 or sum of the three values produces a value distant from the camera A and B values, a single outlier can damage the results of an arithmetic average. The geometric median 195 (a non-linear estimate of central tendency) is not disrupted by a single outlier of any strength.

A further use of the geometric median is as a spatial filter. In the previous paragraph, there is a description of taking the geometric median of several estimates at a single location. The geometric median of a region of pixels around an object of interest can also be taken. For instance, if a 3×3 spatial filter is used on a system with four cameras, there are four estimates at each location and a nine pixel spatial region. Thus, the geometric median of 36 estimates will be taken. The result is more robust against noise than linear filters and is unaffected by problems such as wrapping.

Once the point clouds are merged, the merged values can be used to provide three-dimensional information relative to the surface. Such information can be used for measurement and/or inspection, among other things.

Although the present invention has been described with reference to preferred embodiments, workers skilled in the art will recognize that changes may be made in form and detail without departing from the spirit and scope of the invention. For example, while embodiments have been described in the context of three-dimensional inspection of electronic components, it is understood that embodiments of the present invention are practicable for any three dimensional measurement or inspection of any object.

What is claimed is:

1. A computer-implemented method measuring a three-dimensional surface, the method comprising;
    projecting structured illumination on the three-dimensional surface and acquiring a plurality of sets of images;
    processing the sets of images to obtain a plurality of point clouds, each point in each point cloud having a complex value having a real component and an imaginary component, the complex value representing a quality metric and a spatial value;
    defining a spatial accumulator that is configured to receive point cloud information in each element of a grid in the spatial accumulator;
    accumulating the plurality of point clouds into the spatial accumulator;
    merging the plurality of point clouds in the spatial accumulator; and
    generating spatial coordinates of the three-dimensional surface based on the merged contents of the spatial accumulator.

2. The computer-implemented method of claim 1, wherein the structured illumination is projected from different angles of incidence.

3. The computer-implemented method of claim 1, wherein the plurality of sets of images comprise a first and second set of images, wherein the first and second sets of images are acquired by different cameras.

4. The computer-implemented method of claim 1, wherein the plurality of sets of images includes a first set of images and a second set of images and wherein the first and second sets of images are acquired by projecting two different pattern sets.

5. The computer-implemented method of claim 4, wherein the two different pattern sets are rotated with respect to each other.

6. The computer-implemented method of claim I, wherein the structured illumination is a sinusoidal fringe pattern.

7. The computer-implemented method of claim 1, wherein acquiring a plurality of sets of images includes acquiring a first trio of images using a first camera and a second trio of images using a second camera, wherein the first trio of images are processed to generate a first point cloud and the second trio of images is processed to generate a second point cloud.

8. The computer-implemented method of claim 1, wherein merging the plurality of point clouds in the spatial accumulator includes an algebraic summation of the point clouds into the spatial accumulator.

9. The computer-implemented method of claim. 8, wherein the quality metric is encoded as the magnitude of the complex value and the spatial value is encoded as the phase of the complex value.

10. The computer-implemented method of claim 1, wherein merging the plurality of point clouds in the spatial accumulator includes a non-linear combination.

11. The computer-implemented method of claim 10, wherein the non-linear combination includes determining a geometric median for each element of the spatial accumulator.

12. The computer-implemented method of claim 10, wherein the non-linear combination employs a voting process.

13. The computer-implemented method of claim 1, and further comprising utilizing the spatial coordinates of the three-dimensional surface to provide information relative to the three-dimensional surface.

14. The computer-implemented method of claim 13, wherein the information relative to the three-dimensional surface is inspection information.

15. The computer-implemented method of claim 13, wherein the information relative to the three-dimensional surface is measurement information.

16. The computer-implemented method of claim 1, wherein the plurality of point clouds are merged to reduce errors caused by multiple reflections.

17. A system for measuring a thine-dimensional surface, the system comprising:
a structured illumination projector configured to project structured illumination on the three-dimensional surface;
a controller coupled to the structured illumination projector to control the structured illumination projector to generate multiple distinct structured illumination projections on the three-dimensional surface;
a plurality of cameras, each coupled to the controller, wherein each camera is configured to acquire an image of the three-dimensional surface while each distinct structured illumination projection is present on the three-dimensional surface;
wherein the controller is configured to receive image information from each camera and generate a plurality of point clouds, each point in each point cloud having a complex value with a real component and an imaginary component, the complex value representing three-dimensional image data and a quality metric from a respective camera for each point; and
wherein the controller is configured to accumulate the plurality of point clouds into a spatial accumulator then merge the plurality of point clouds in the spatial accumulator as contents of the spatial accumulator, and generate a single, merged three-dimensional point cloud using the contents of the spatial accumulator.

18. The system of claim 17, wherein the structured illumination projector includes a spatial light modulator.

19. The system of claim 18, wherein the spatial light modulator is coupled to the controller to receive a signal from the controller defining each structured illumination projection.

20. The system of claim 19, wherein each structured illumination projection includes a sinusoidal fringe pattern having a phase that differs from the other structured illumination projections.

21. The system of claim 17, wherein the controller is configured to merge the plurality of point clouds by performing an algebraic summation of the complex values.

22. The system of claim 17. wherein the controller is configured to merge the plurality of point clouds in a non-linear operation.

23. The system of claim 22, wherein the non-linear operation includes determining a geometric median for corresponding points in the respective point clouds.

24. The system of claim 22, wherein the non-linear operation includes a voting process.

25. A system for measuring a three-dimensional surface, the system comprising:
a plurality of structured illumination projectors each configured to project structured illumination on the three-dimensional surface from a different angle of incidence;
a controller coupled to the structured illumination projectors to control the structured illumination projectors to generate multiple distinct structured illumination projections on the three-dimensional surface;
a camera coupled to the controller and configured to acquire an image of the three-dimensional surface while each distinct structured illumination projection is present on the three-dimensional surface;
wherein the controller is configured to receive image information from the camera and generate plurality of point clouds, each point in each point cloud having a complex value with a real component and an imaginary component, the complex value representing three-dimensional image data and a quality metric from the camera for each point; and
wherein the controller is configured to accumulate the plurality of point clouds into a spatial accumulator then merge the plurality of point clouds in the spatial accumulator as, contents of the spatial accumulator, and generate a single, merged three-dimensional point cloud using the contents of the spatial accumulator.

26. The system of claim 25, wherein the merged three-dimensional point cloud includes a quality metric for each point in the merged three-dimensional point cloud.

* * * * *

UNITED STATES PATENT AND TRADEMARK OFFICE
CERTIFICATE OF CORRECTION

PATENT NO. : 10,346,963 B2
APPLICATION NO. : 14/850470
DATED : July 9, 2019
INVENTOR(S) : Eric P. Rudd and Carl E. Haugan Page 1 of 1

It is certified that error appears in the above-identified patent and that said Letters Patent is hereby corrected as shown below:

In the Specification

Column 2, Line 2, after the word "components" should be a "."

In the Claims

Column 11 Claim 17, Line 28, "thine-dimensional" should be "three-dimensional"

Column 12 Claim 25, Line 39, after the word "generate" should be "a"

Column 12 Claim 25, Line 48, the "," after "as" should be removed

Signed and Sealed this
Twenty-eighth Day of January, 2020

Andrei Iancu
*Director of the United States Patent and Trademark Office*